(12) United States Patent
Vasudevan

(10) Patent No.: US 8,702,219 B2
(45) Date of Patent: Apr. 22, 2014

(54) PIGMENTED INK-JET INKS WITH GLOSS-ENHANCING POLYMERS

(75) Inventor: Sundar Vasudevan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 437 days.

(21) Appl. No.: 13/132,067

(22) PCT Filed: Dec. 18, 2008

(86) PCT No.: PCT/US2008/087381
§ 371 (c)(1),
(2), (4) Date: May 31, 2011

(87) PCT Pub. No.: WO2010/071646
PCT Pub. Date: Jun. 24, 2010

(65) Prior Publication Data
US 2011/0234722 A1 Sep. 29, 2011

(51) Int. Cl.
B41J 2/01 (2006.01)
(52) U.S. Cl.
USPC .............................................. 347/100; 347/95
(58) Field of Classification Search
USPC ......... 347/100, 95, 96, 88, 99, 21, 20, 9, 101, 347/102, 105; 106/31.6, 31.13, 31.27; 523/161, 160
See application file for complete search history.

(56) References Cited

U.S. PATENT DOCUMENTS

| | | | |
|---|---|---|---|
| 5,354,368 A | 10/1994 | Larson, Jr. et al. | |
| 5,883,157 A * | 3/1999 | Yamashita et al. | 523/161 |
| 6,166,105 A | 12/2000 | Santilli et al. | |
| 6,232,405 B1 * | 5/2001 | Schmidhauser et al. | 523/160 |
| 6,376,611 B1 | 4/2002 | Matzinger | |
| 6,726,757 B2 | 4/2004 | Sarkisian et al. | |
| 6,737,231 B2 | 5/2004 | Kawanishi et al. | |
| 6,866,379 B2 | 3/2005 | Yau et al. | |
| 6,953,244 B2 | 10/2005 | Chen et al. | |
| 6,972,305 B1 | 12/2005 | Griessmann et al. | |
| 6,995,206 B2 | 2/2006 | Zhou et al. | |
| 7,018,453 B2 | 3/2006 | Klein et al. | |
| 7,205,341 B2 | 4/2007 | Aida | |
| 7,402,614 B2 | 7/2008 | Marguerettaz et al. | |

(Continued)

FOREIGN PATENT DOCUMENTS

| CN | 1041964 A | 5/1990 |
|---|---|---|
| CN | 1400991 | 3/2003 |

(Continued)

OTHER PUBLICATIONS

Hewlett-Packard Development Co., L.P., PCT International Search Report and the Written Opinion of the International Searching Authority dated Sep. 7, 2009; PCT App. No. PCT/US2008/087381, filed Dec. 18, 2008.

*Primary Examiner* — Manish S Shah

(57) ABSTRACT

An ink-jet ink is disclosed which comprises polymer-dispersed pigment particles in a liquid vehicle, wherein the polymer has an acid number of at least about 175 and comprises polymer molecules having anionic groups and hydrogen bond-forming groups. The anionic groups and the hydrogen bond-forming groups are configured on each of the polymer molecules to permit association of the anionic groups with cationic groups on a print medium, and to also permit the hydrogen bond-forming groups on neighboring polymer molecules to interact pair wise with each other, as the liquid vehicle dries and/or is absorbed into the medium.

20 Claims, 2 Drawing Sheets

(56) References Cited

U.S. PATENT DOCUMENTS

| | | |
|---|---|---|
| 2003/0106462 A1 | 6/2003 | Yatake et al. |
| 2005/0027035 A1* | 2/2005 | Wang et al. .............. 523/160 |
| 2005/0090599 A1 | 4/2005 | Spinelli |
| 2005/0137282 A1 | 6/2005 | Cagle et al. |
| 2005/0228071 A1 | 10/2005 | Vasudevan |
| 2006/0084720 A1 | 4/2006 | Tyvoll et al. |
| 2006/0089421 A1 | 4/2006 | Vasudevan |
| 2006/0089422 A1 | 4/2006 | Vasudevan |
| 2006/0089424 A1 | 4/2006 | Sanada et al. |
| 2006/0094796 A1 | 5/2006 | Vasudevan |
| 2006/0100306 A1 | 5/2006 | Yau et al. |
| 2006/0185100 A1 | 8/2006 | Tzikas |
| 2006/0207473 A1 | 9/2006 | Vasudevan |
| 2007/0032571 A1 | 2/2007 | Furuno et al. |
| 2007/0040880 A1 | 2/2007 | Jackson et al. |
| 2007/0100024 A1 | 5/2007 | Gu et al. |
| 2007/0126839 A1 | 6/2007 | Kelly-Rowley et al. |
| 2007/0129462 A1 | 6/2007 | Ma |
| 2007/0129463 A1 | 6/2007 | Ma et al. |
| 2007/0132822 A1 | 6/2007 | Szajewski et al. |
| 2007/0181037 A1 | 8/2007 | Vasudevan |
| 2007/0211125 A1 | 9/2007 | Vasudevan et al. |
| 2010/0016469 A1* | 1/2010 | Bertelsen et al. .............. 523/122 |

FOREIGN PATENT DOCUMENTS

| | | |
|---|---|---|
| CN | 1860188 A | 11/2006 |
| CN | 101171312 A | 4/2008 |
| EP | 1580240 B1 | 10/2007 |
| JP | 2004035872 | 2/2004 |
| JP | 2004300166 | 10/2004 |
| JP | 2005097433 | 4/2005 |
| JP | 2005206715 | 8/2005 |
| JP | 2006008797 | 1/2006 |
| JP | 2006104459 | 4/2006 |
| JP | 2007099923 | 4/2007 |
| JP | 2007154133 | 6/2007 |
| JP | 2008024830 | 2/2008 |
| WO | 2005012446 A1 | 2/2005 |
| WO | 2006080497 A1 | 8/2006 |
| WO | 2006099551 A2 | 9/2006 |
| WO | 2007112337 A2 | 10/2007 |
| WO | 2010071646 | 6/2010 |

\* cited by examiner

PIGMENTED INK-JET INKS WITH GLOSS-ENHANCING POLYMERS

CROSS-REFERENCE TO RELATED APPLICATION

The present application is the U.S. National Stage under 35 U.S.C. §371 of International Patent Application No. PCT/US2008/087381, filed 18 Dec. 2008, the disclosure of which is hereby incorporated herein by reference.

BACKGROUND

Pigmented ink-jet inks tend to have certain advantages over dye-based inks for ink-jet printing on conventional print media. Some of these advantages are light and ozone fastness of the printed image and good permanence on porous photo media. There are challenges associated with the use of pigmented ink-jet inks, however, such as insufficient gloss and lack of adequate scratch durability, especially on certain types of media such as porous photo paper. Prior efforts to improve gloss and durability of ink-jet printed images have generally involved coating the printed medium or adding polymeric binders to the inks. Although polymeric binders may enhance the gloss and durability characteristics of some inks, there is a limit to the amount of polymer that can be added to an ink before the viscosity of the liquid becomes too high for the ink to be reliably jetted from a thermal ink-jet pen. There is continuing interest in the development of pigmented ink-jet inks that have good gloss and scratch durability characteristics.

BRIEF DESCRIPTION OF THE DRAWINGS

Some aspects of this disclosure can be better understood with reference to the following drawings. The components of the drawings are not necessarily to scale.

DETAILED DESCRIPTION

Notation and Nomenclature

Figure 1:
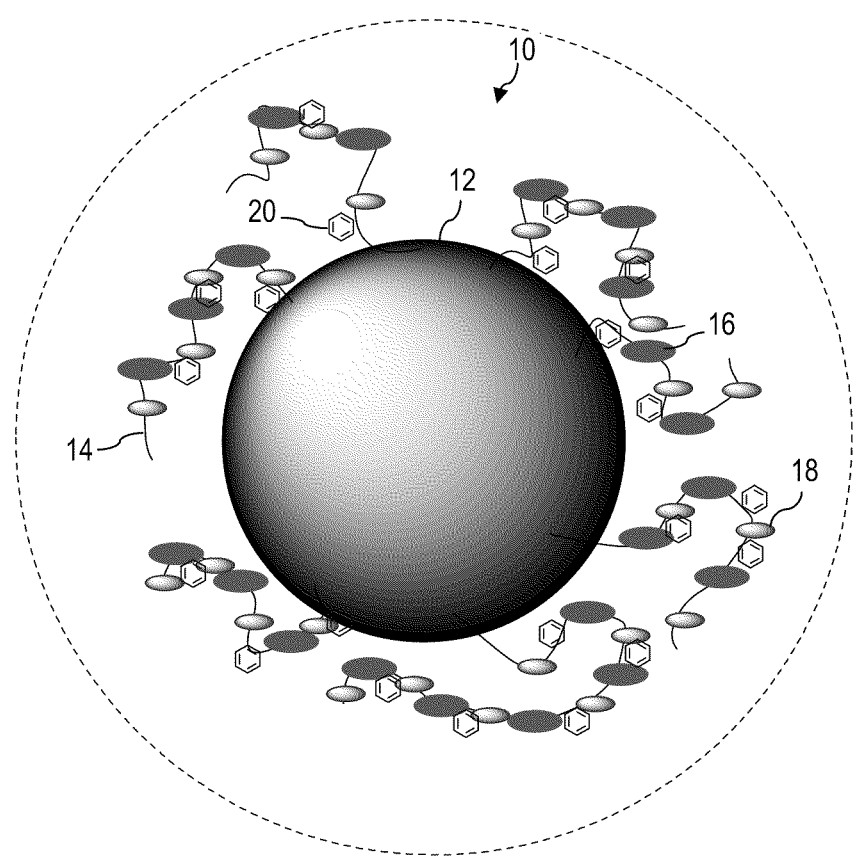
FIG. 1 is a conceptual illustration of a hydrated polymer-attached pigment particle dispersed in an ink-jet ink, in accordance with an embodiment of the invention.

Certain terms are used throughout the following description and claims to refer to particular system components. As one skilled in the art will appreciate, printing technology companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

As used herein, "high acid number polymer" refers to polymers with acid number of 175 and above. Acid number of a polymer is defined as the number of mg of potassium hydroxide (KOH) needed to completely neutralize the acidic groups in one gram of the polymer.

As used herein, "pigment" refers to a colorant particle which is typically substantially insoluble in the liquid vehicle in which it is used. References to a "pigment particle" may also include a pigment particle with one or more attached dye molecules.

"Pigment-based ink-jet ink" or "pigment-based ink" refers to ink that includes one or more pigments that may be used in an ink-jet printing system.

A "printed image" or "print" refers to ink that has been deposited or recorded (e.g., by ink-jetting) on an ink-receiving surface, such as a porous photo medium.

The term "liquid vehicle" is defined to include liquid compositions that may be used to carry colorants, including pigments, to print media (e.g., photo media). Liquid vehicles are well known in the art, and a wide variety of liquid vehicle components may be used in accordance with the present systems and methods. Such liquid vehicles may include one or more of a variety of different agents, including, but not limited to, surfactants, co-solvents, humectants, buffers, biocides, viscosity modifiers, sequestering agents, stabilizing agents, and water. Though not liquid per se, the liquid vehicle may also carry other solids, such as polymers, UV curable materials, plasticizers, salts, and other conventional ink-jet ink components.

The term "porous" is defined to involve a structure or material having a plurality of pores therein through which fluids and smaller particulates may pass and/or reside. The transfer of fluids (e.g., pigment-based ink-jet ink and the like) into and through a porous ink receiving surface of a print medium may occur via physical phenomena normally associated with porous materials including capillary action and the like.

"Gloss" of a surface is defined as its degree of approach to a mirror-like surface. It is a measure of the amount of light reflected at a reflection angle equal to or near the angle of incidence. Gloss can be measured in terms of gloss units (gu) and at several angles, e.g., 20°, 30°, 45°, 60°, 75° and 80° from the surface normal. Gloss meters may be used to measure the gloss of a sample at various angles. The BYK-Gardner micro-TRI-glossmeter is an example of such an instrument.

"Scratch durability" refers to the ability of printed ink to withstand damage caused by scratching, rubbing, or other method of directly contacting the printed image.

"Waterfastness" refers to water resistance as defined in ISO standard number ISO/DIS 18935 "Imaging Materials —Colour images on paper prints —Methods for determining and specifying indoor water resistance." "Waterfastness" refers to resistance of movement of the colorant making up a printed image when exposed to water. 100% waterfastness is no movement of colorant of the printed image. Waterfastness is measured by dripping water onto a printed sample inclined at 45 degrees and measuring the amount of optical density change caused by colorant movement from the printed area to an unprinted area.

"Frequency response" refers to the performance of ink-jet ink and ink-jet architecture used in combination with respect to ink-jet ink firing speed, e.g., drops fired per unit of time. Generally, a nozzle firing frequency that is higher than contemplated for use with respect to a specific ink-jet ink and ink-jet architecture may result in poorer print performance, such as by producing misdirected ink drops and other undesirable characteristics. By current standards, firing frequencies above about 12 kHz are considered to be fast printing frequencies.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

The term "about" when referring to a numerical value or range is intended to encompass the values resulting from experimental error that can occur when taking measurements.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. Some exemplary embodiments of high acid number polymer-dispersed pigment particles, when used in jettable ink formulations, produce images of high gloss, gloss uniformity, and scratch resistance on porous print media, and in certain embodiments also have good waterfastness.

Polymer-attached Pigments

Any suitable pigment for imparting color to the ink and for attaching to a polymer as herein described is used to make the polymer-attached pigments. For example, the pigment may comprise organic or inorganic pigment particles, including black pigments, white pigments, cyan pigments, magenta pigments, yellow pigments, and the like. Examples of suitable inorganic pigments are titanium oxide, cobalt blue (CoO—$Al_2O_3$), chrome yellow ($PbCrO_4$), and iron oxide. Suitable organic pigments include, for example, carbon black, azo pigments including diazo pigments and monoazo pigments, polycyclic pigments (e.g., phthalocyanine pigments such as phthalocyanine blues and phthalocyanine greens, perylene pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 177, Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation and Sun Chemical Corporation.

Still other examples of color pigments are CABO-JET 250C, CABO-JET 260M, and CABO-JET 270Y (Cabot Corp.); PALIOGEN Orange, PALIOGEN Orange 3040, PALIOGEN Blue L 6470, PALIOGEN Violet 5100, PALIOGEN Violet 5890, PALIOGEN Yellow 1520, PALIOGEN Yellow 1560, PALIOGEN Red 3871 K, PALIOGEN Red 3340, HELIOGEN Blue L 6901F, HELIOGEN Blue NBD 7010, HELIOGEN Blue K 7090, HELIOGEN Blue L 7101F, HELIOGEN Blue L6900, L7020, HELIOGEN Blue D6840, HELIOGEN Blue D7080, HELIOGEN Green L8730, HELIOGEN Green K 8683, and HELIOGEN Green L 9140 (BASF Corp); CHROMOPHTAL Yellow 3G, CHROMOPHTAL Yellow GR, CHROMOPHTAL Yellow 8G, IGRAZIN Yellow 5GT, IGRALITE Rubine 4BL, IGRALITE Blue BCA, MONASTRAL Magenta, MONASTRAL Scarlet, MONASTRAL Violet R, MONASTRAL Red B, and MONASTRAL Violet Maroon B (Ciba-Geigy Corp.); DALAMAR Yellow YT-858-D and HEUCOPHTHAL Blue G XBT-583D (Heubach Group); Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, HOSTAPERM Orange GR, HOSTAPERM Scarlet GO, HOSTAPERM Pink E, Permanent Rubine F6B, and the HOSTAFINE series (Hoechst Specialty Chemicals); QUINDO Magenta, INDOFAST Brilliant Scarlet, QUINDO Red R6700, QUINDO Red R6713, and INDOFAST Violet (Mobay Corp.); L74-1357 Yellow, L75-1331 Yellow, and L75-2577 Yellow (Sun Chemical Corp.). Other examples of color pigments for ink-jet inks are Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, and Lithol Fast Scarlet L4300 (available, variously, from known commercial sources such as Hoechst Celanese Corporation, Paul Uhlich, BASF, American Hoechst, Ciba-Geigy, Aldrich, DuPont, Ugine Kuhlman of Canada, Dominion Color Company, Magruder, and Matheson).

Examples of suitable black pigments are carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, but are not limited to, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments;

Columbian pigments such as RAVEN 7000, RAVEN 5750, RAVEN 5250, RAVEN 5000, and RAVEN 3500; Degussa pigments such as Color Black- FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V available from Dupont. The above list of pigments includes unmodified pigment particulates, small molecule attached pigment particulates, and polymer-dispersed pigment particulates. Alternatively, almost any commercially available carbon pigment may be used, as long as it provides acceptable optical density and print characteristics for a selected application.

In many embodiments, the volume average diameter of the pigment particles is about 10 nm to about 10 μm, and in some cases the average diameter is in the range of about 10 nm to about 500 nm, although sizes outside these ranges may also be used as long as the selected pigment particles provide adequate color properties and the polymer-attached pigment particles can remain dispersed in the ink composition. In some embodiments the pigment comprises an amount in the range of about 0.1% to about 10.0% by weight of the ink-jet ink composition, and in certain embodiments is about 1 wt % to about 5 wt %.

High acid number polymers are either covalently attached or they are physically or chemically adsorbed to the pigments, which may be either black or color pigments, to disperse the pigments in the ink vehicle. One example of a high acid number polymer is polyacrylic acid (PAA). Other suitable high acid number polymers include: ISOBAM, a copolymer of isobutylene and maleic anhydride; styrene maleic anhydride (SMA) copolymers; and SMA1000MA (Sartomer Company), which is a copolymer of 1:1 ratio of styrene and maleic anhydride with part of the anhydride groups treated with methylamine to form the amide. Similar treatment of styrene maleic anhydride copolymer with other amines would lead to corresponding amide modified polymers that may also be useful in the methods disclosed herein. The maleic anhydride groups in ISOBAM polymers may also be similarly treated with methylamine or other alkyl amines to form the corresponding amide modified polymers. Other suitable polymers are copolymers of methyl vinyl ether with maleic anhydride or acrylic acid, and homopolymers of methacrylic acid or maleic anhydride. Polymers of number average molecular weight (Mn) of 2000 to 5000 and weight average molecular weight (Mw) between 5000 and 15000 are used in many embodiments, although, in some cases a polymer outside this molecular weight range may be used. In some embodiments the high acid polymer comprises an amount in the range of about 0.05% to about 15.0% by weight of the ink-jet ink composition, and in certain embodiments is in the range of about 0.4 wt % to about 3.0 wt %.

The polymer attached to or adsorbed on the pigment has an acid number of at least 175 in order to provide good gloss and scratch durability in an ink-jetted ink. The upper limit of the polymer's acid number is dependent on the nature of the polymer. For example, polyacrylic acid (PAA) has an acid number of about 780, and SMA1000MA has an acid number of about 240.

In some applications, the high acid number polymers are attached to the pigment surface using either of the following two chemistries:

I APSES/PEHA/Polymer. 4-(aminophenylsulfonyl)ethyl sulfate (APSES) is diazotized and coupled to the pigment surface. Pentaethylenehexamine (PEHA) is added to APSES, and then the polymers are conjugated to the amine groups of PEHA. This general technique is known in the art, and is described, in U.S. Pat. No. 6,723,783, for example.

II. ABA/Polymer. 4-aminobenzylamine (ABA) is diazotized and coupled to the pigment surface. The benzyl amine on the other end is used to react to carboxyl groups on polymers. This general technique is known in the art, and is described in U.S. Patent Application Publication No. 20030205171, for example.

Ink-Jet Inks Containing the Polymer-Attached Pigments

The pigmented ink-jet inks suitable for use with the surface treated print media described herein may additionally include any suitable vehicles or additives as are known in the art of preparing ink-jet inks. Some of these include water, organic co-solvents, dye-based colorants, pH buffers, viscosity modifiers, antimicrobials, and surfactants. In various ink formulations, the amount of buffer is about 0.05 to 8 weight percent, about 0.05 to 5 weight percent, or about 0.1 to 3.5 weight percent of the ink formulation, for example. The selected buffer may have pKa of about 5.5 to 11.0, or about 6.0 to 10.0, or 7.5 to 9.5, or about 7.0 to 9.5, for example. In some embodiments, the buffer is a borate buffer. Examples of borate buffers include sodium borate, potassium borate, lithium borate, ammonium borate, and combinations thereof. Still other examples of borate buffers that may be used to buffer the ink-jet ink include triethanolamine borate, diethanolamine borate, ethanolamine borate, and combinations thereof. In some formulations, the ink formulation is buffered with tetramethylammonium borate. The pH of the ink may be buffered at about pH 8.8 in some cases, which corresponds to 2.2 pH units above the pKa of the carboxyl groups of a dispersion stabilized by SMA1000MA, for example. In theory, the carboxyl groups in that polymer will be completely deprotonated at pH 8.8 and above. Similarly, the pKa of carboxyl groups of a dispersion stabilized by polyacrylic acid (PAA) and JONCRYL 683 are about 6.5 and 7.3 respectively. If the inks were buffered at 1 to 2 pH units or more above the pKa of the carboxyl groups of a polymer stabilizing a pigment dispersion, the carboxyl groups would all be deprotonated and provide good stability for the ink.

Figure 2:
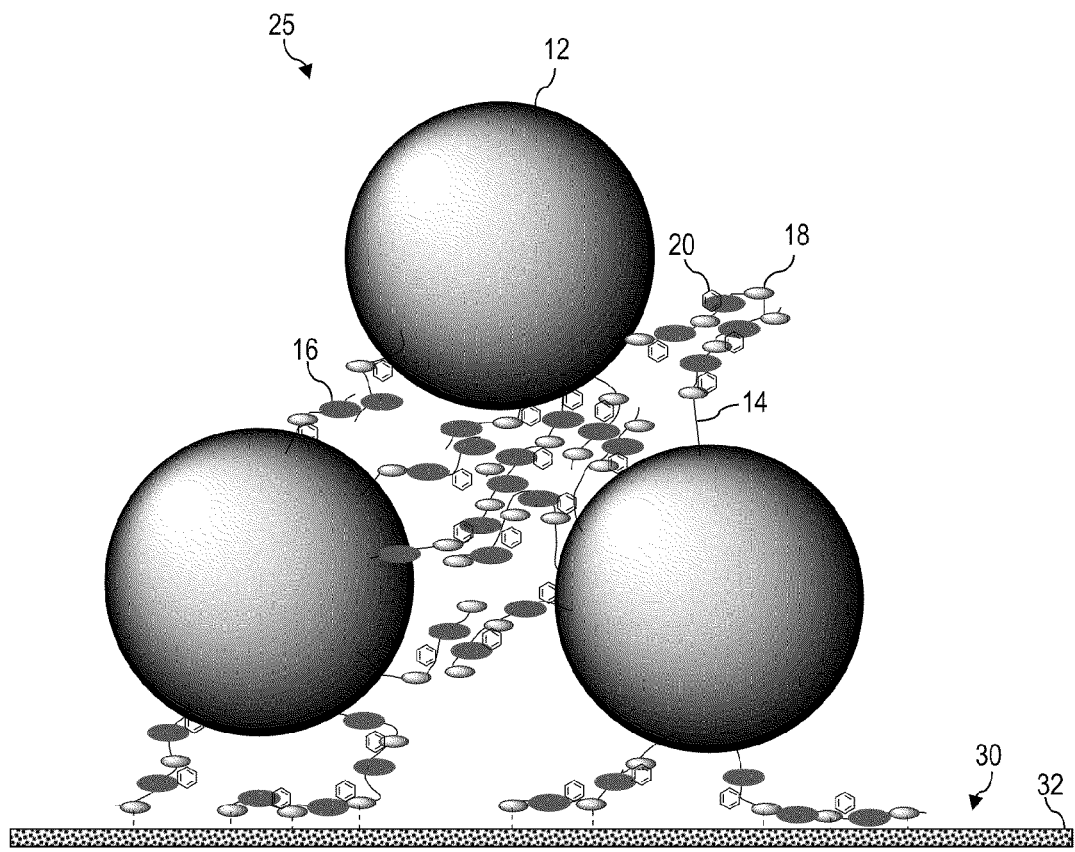
FIG. 2 is a conceptual illustration of a group of the polymer-attached pigment particles of FIG. 1 deposited on a print medium, after water removal, in accordance with an embodiment of the invention.

FIG. 1 illustrates an exemplary polymer-linked pigment particle 10 in hydrated form, in which the pigment 12 is dispersed and stabilized in aqueous solution by one or more high acid number polymer molecules 14 such as SMA1000MA linked to pigment 12. In each polymer molecule 14, each of the dark ovals spaced apart along the length of the polymer molecules represents a hydrogen bonding group 16 (e.g., amide group). Each of the smaller, light colored ovals in FIG. 1 represents a negatively charged group 18 (e.g., carboxylate group) on the polymer molecule 14. The hexagonal benzene structures 20 represent styrene moieties. In aqueous solution, the water molecules are able to solvate the carboxylate negative charges as well as hydrogen bond with the amide groups, thus preventing two polymer strands on the same or different pigment particles from touching each other. In FIG. 1, the circle (dashed line) represents the sphere of hydration of the polymer-linked pigment particle 10 when it is dispersed in an aqueous ink-jet ink vehicle. FIGS. 1 and 2 are conceptual illustrations and are not drawn to scale.

Compared to inks containing the same pigments dispersed by attaching other polymers (e.g., JONCRYL 683) as controls, representative ink-jetted print samples made with the above-mentioned high acid number polymer-attached pigment dispersions demonstrated higher, more uniform gloss and scratch durability. An exemplary ink composition comprises 3-4% (by weight) pigment (not including attached polymer) dispersed in a water-based vehicle.

Ink-Jet Printing

Ink-jet inks containing the above-described polymer-attached pigments are suitably employed with any ink-jet printer using any drop on demand or continuous ink jet technology, such as thermal ink-jet or piezoelectric ink-jet technology, as are known in the art. A selected ink-jet printer may be a printer with a fast printing frequency. Any suitable porous print medium that is rich in positive charges from silanol groups, hydrated alumina groups and/or quaternary ammonium ions may be used for printing the above-described polymer-attached pigments.

FIG. 2 is a conceptual illustration of an exemplary group of the SMA 100MA-linked pigment particles 10 of FIG. 1, after being deposited via ink-jetting onto a porous print medium 30, and dried to form an image-bearing film 25 on the ink-receiving surface 32 of print medium 30. The ink-receiving surface 32 is rich in positive charges from silanol groups, hydrated alumina groups and/or quaternary ammonium ions. As water drains into the porous ink-receiving surface or layer 32, and/or evaporates, the negative charges of the carboxylate groups 18 interact with positive charges on the media by ion-pair interaction. The ion-pair interaction is denoted by dashed lines in FIG. 2. This results in a printed image with high and uniform gloss, compared to many other pigment-based images printed on porous media. Without wishing to be limited to any particular theory, it is thought that at the same time that the above-mentioned ion-pair interactions are forming, as water is removed from the ink droplets, the hydrogen-bonding amide groups 16 on adjacent polymer strands form H—H bonds among themselves. Since water is an excellent hydrogen-bonding donor, as well as acceptor, once it is removed from the jetted ink droplets, the H—H interaction between adjacent polymer strands dominates. This gives the dried film enhanced durability and gloss uniformity. The hydrogen bonding amide groups are adjacent to hydrophobic styrene groups, denoted in FIG. 2 as hexagonal benzene rings. Once the film 25 dries, these hydrophobic groups prevent water from reaching the hydrogen bonding sites. As a result, waterfastness of the print sample is also enhanced.

As mentioned above, the selected print medium is rich in positive charges (e.g., silanol groups and quaternary ammonium ions or protonated alumina groups) available for ion pairing with counterpart negatively charged groups on the high acid number polymer. The print medium has any suitable configuration for receiving an ink-jetted image. In many cases it is configured as a flat sheet of any suitable dimensions and thickness along substantially its entire length, for use with an ink-jet printing device. For example, in some instances the thickness of the medium is in the range of about 0.025 mm to about 0.5 mm. In some cases the medium is laminated or extruded with an ink-impermeable layer, such as polyethylene for example. In some cases the medium has an ink-impermeable layer on both sides.

EXAMPLES

Example 1

Inks Containing PAA-Pigments

Inks were made with cyan and magenta pigment dispersions at 3 and 4% pigment load respectively in a simple vehicle. For each color, pigments dispersed by attaching high acid number poly(acrylic acid) (PAA) were used as test samples and those dispersed by attaching JONCRYL 683 were used as control samples.

The dispersions were prepared into inks, as follows, wherein the indicated percentages are by weight.

Pigment: 3 or 4%
Vehicle:
    Diethylene glycol: 2%
    1,2-Hexanediol: 4%
    Glycerol: 5%
    LEG-1: 5%
    TERGITOL 15S7: 1%
    ZONYL FSO: 0.2%
    PROXEL GXL: 0.2%
    Balance water LEG-1 is ethoxylated glycerin from Lipo Chemicals and is also known as GLYCERETH-26. TERGITOL 15S7 is a secondary alcohol ethoxylate non-ionic surfactant available from Dow Chemicals. ZONYL FSO is a non-ionic ethoxylated fluorosurfactant from DuPont. PROXEL is 1,2-benzisothiazolin-3-one (BIT), a commonly used biocide in inkjet inks. The approximate pH of the PAA and JONCRYL inks were about 9.2 to 9.4, and the SMA1000MA inks were about pH 9.9. The inks were filled in a tricolor print cartridge and printed on porous photo media (HP Advanced Photo Paper Glossy) using HP DESKJET 6540 printer. Their 20° gloss was measured after the prints had plenty of time to dry, typically overnight. Their resistance to finger nail scratches was also evaluated by a subjective test at that time.

The test results, and the pigment to polymer ratios in the inks are summarized in Table 1.

TABLE 1

| Sample | PAA-Cyan | JONCRYL-Cyan | PAA-Magenta | JONCRYL-Magenta |
|---|---|---|---|---|
| Average 20° gloss | 53.9 | 22.7 | 50.0 | 38.0 |
| Scratch durability | Excellent | Poor | Excellent | Poor |
| Pigment to polymer ratio | 1.43 | 1.97 | 1.59 | 2.23 |

A 20° gloss value of between 40 and 60 gloss units (gu) is considered good. As can be seen from Table 1, dispersions made by attaching the high acid number polymer, poly(acrylic acid), had the desirable gloss. For comparison, gloss values for inks made with dispersions made by attaching JONCRYL 683 to the same respective base pigments are also included in the Table 1. Those inks were found to have poor gloss.

Finger nail scratch durability of prints made using the various inks was also evaluated by a subjective visual test. Print samples made with poly(acrylic acid) attached dispersions had excellent scratch resistance by this test method. In comparison, those made with JONCRYL 683 attached dispersions had poor scratch durability characteristic of print samples created with most pigment based inks.

Example 2

Inks Containing SMA1000MA-Pigments

Inks were prepared in the same way as described in Example 1, using the same vehicle and cyan and magenta pigments at 3 and 4% pigment load, respectively. The test results, and the pigment to polymer ratios in the inks are summarized in Table 2.

TABLE 2

| Polymer | Cyan | | | Magenta | | |
|---|---|---|---|---|---|---|
| | SMA1000MA | PAA2000 | JONCRYL683 | SMA1000MA | PAA2000 | JONCRYL683 |
| Average 20° Gloss | 43.0 | 52.1 | 22.7 | 50.7 | 50.8 | 38.0 |
| Scratch Durability | Excellent | Excellent | Poor | Excellent | Excellent | Poor |
| Water Fastness | Yes | No | Yes | Yes | No | Yes |
| Pigment to Polymer Ratio | 1.31 | 4.15 | 1.97 | 1.84 | 4.01 | 2.23 |
| Acid No. | 241 | 779 | 165 | 241 | 779 | 165 |
| Source | Calculated | Calculated | Vendor | | | |

In Table 2, JONCRYL 683, with acid number 165, does not demonstrate good gloss nor is it scratch durable. The pigment to polymer ratio is an indication of the amount of polymer attached to the pigment. The smaller the ratio, the higher the amount of polymer for a given amount of pigment. It is predicted that the higher the amount of a given polymer the higher the scratch durability. In the examples above, the cyan ink made with a dispersion of JONCRYL 683-attached pigment has more polymer than one made with PAA2000-attached pigment. Nevertheless, the latter ink demonstrates higher gloss and scratch durability than the former due to the higher acid number of the PAA2000 polymer.

While high acid number polymers promote scratch durability, "mutually accessible" hydrogen-bonding groups promote water fastness in the printed inks. In further tests, part of the carboxyl groups in PAA2000 were treated with butylamine in a magenta ink dispersion, to form the corresponding amide. The resultant dispersions were waterfast, however, their gloss was lower and their scratch durability was also reduced. Similar tests were conducted with an ink dispersion containing SMA 1000MA, which is a methylamine modified SMA polymer. These tests yielded results similar to those described above for PAA2000 with respect to scratch durability. This indicates that in some applications, SMA 1000MA with an acid number of 241 and mutually accessible hydrogen-bonding groups in the form of N-methyl amides is a suitable polymer. In contrast, the N-butyl amides or half esters of SMA would not be a satisfactory polymer. In the case of half esters of SMA there are no hydrogen-bonding groups, and in the case of N-butyl amides the hydrogen-bonding groups would not be mutually accessible. N,N-dialkyl amides would also not be expected to be very effective, as there is also no hydrogen bond donor in those compounds. Simple unsubstituted amides may hydrogen bond sufficiently in some embodiments, as they have one acceptor and two donors per amide group. Thus, a suitable polymer will have a high acid number and also provide steric accessibility of the hydrogen bonding groups on a selected pigment surface to counterpart hydrogen bonding groups on the polymer strands. Without being limited to a single theory, it is proposed that there is an electrostatic interaction between the anionic carboxylate or other anionic groups on the surface of the pigment and the cationic groups, such as ammonium and/or silanol groups, on the media. As a result, when readily accessible hydrogen bonding groups are also on the pigment surface, the polymer strands attached to one particle will interact with those on other polymer-attached particles to enhance waterfastness.

Polymer-Dispersed Pigmented Inks (Unbound Polymer)

As an alternative to the above-described ink formulations, the same or similar higher acid number polymers may be used to disperse the pigments without being covalently attached to the pigment particles. Similar vehicles to those described above are used to prepare the ink formulations. In this case, the higher acid number polymer(s) (i.e., having acid numbers of at least 175) are ground together with the selected pigment(s), and the resulting mixture is then dispersed in the vehicle. Any suitable milling technique may be used. For example, one such milling technique is described in U.S. Pat. No. 5,679,138. Another technique which may be employed is high speed homogenization to make a pigment dispersion. In some embodiments, the same monomer composition, molecular weight and polymer to pigment ratios are used for either covalent attachment of the high acid polymer or for preparing a polymer dispersed pigment without covalent attachment.

In certain embodiments, an ink-jet ink is provided that comprises polymer-dispersed pigment particles in a liquid vehicle, wherein the polymer has an acid number of at least about 175 and comprises polymer molecules having anionic groups configured on the polymer molecules to permit association of the anionic groups with cationic groups on a print medium, and having hydrogen bond-forming groups configured on each polymer molecule to permit the hydrogen bond-forming groups to interact pair wise with other said polymer molecules, upon removal of the liquid vehicle. In some embodiments, the acid number of the polymer is 200 or more. In some embodiments, the acid number is about 241 and the polymer molecules have anionic groups and H-bonding groups arranged on the polymer molecule as described above. In some embodiments, the polymer-dispersed pigment particles comprise at least one dye molecule attached to the particles.

In some embodiments, the polymer-dispersed pigment particles comprise at least one polymer molecule covalently attached to each pigment particle. In some embodiments, the polymer-dispersed pigment particles comprise at least one polymer molecule hydrogen bonded to each pigment particle. In some embodiments, the high acid number polymer dispersant is present in the ink vehicle without being chemically or physically attached to the pigment particles.

In some embodiments, the anionic groups comprise carboxylates, sulfonates, sulfates, phosphonates, phosphates, borates, phenoxides, thiolates or a combination of any of those groups.

In some embodiments, the weight average molecular weight of the polymer is in the range of about 2000 to about 15,000. In some embodiments, the polymer comprises the co-polymerization product of methylvinyl ether and maleic anhydride. In some embodiments, the polymer comprises the co-polymerization product of methylvinyl ether and acrylic acid. In some embodiments, the polymer comprises the co-polymerization product of methylvinyl ether, maleic anhydride, and acrylic acid. In some embodiments, the polymer comprises the polymerization product of methyl acrylic acid or maleic anhydride.

In some embodiments, the high acid number polymer comprises the co-polymerization product of a 1:1 molar ratio of styrene and maleic anhydride in which half of the original carboxylic acid groups in the polymer are converted to the corresponding amide with methylamine. In some embodiments, the high acid number polymer comprises the co-polymerization product of a 1:1 molar ratio of styrene and maleic anhydride in which half of the original carboxylic acid groups in the polymer are converted to the corresponding amide with ethylamine. In some embodiments, the high acid number polymer comprises the copolymerization product of isobutylene and maleic anhydride in which part of the original carboxylic acid groups in the polymer are converted to the corresponding amide using methylamine or ethylamine.

Also provided in accordance with certain embodiments is an ink-jet printing system comprising an ink receptive medium comprising a surface that includes cationic groups; an above-described ink-jet ink containing a high acid number polymer-dispersed pigment; and an ink-jet printer configured for jetting the ink onto the medium. In some embodiments, the cationic surface groups comprise ammonium groups, silanol, or protonated alumina groups, or a combination of any of those.

Still further provided in accordance with certain embodiments is a method of enhancing scratch resistance of an ink-jet printed image, which comprises providing an above-described ink-jet ink containing a high acid number polymer-dispersed pigment; jetting the ink onto a ink-jet ink receiving medium (e.g., a porous print medium), to form a wet printed image on the medium; and drying the wet image to form a scratch resistant film containing the image on the medium. In some embodiments, the film on the medium comprises a minimum 20° gloss value of 40 gu on a porous print medium. In some embodiments, the scratch resistant film has enhanced waterfastness.

In another embodiment, a method of enhancing scratch resistance and waterfastness of an ink-jet printed image is provided that includes selecting a print medium comprising an ink-receiving surface including cationic groups; selecting at least one polymer molecule having an acid number of at least about 175, having anionic groups configured on each polymer molecule to permit association of the anionic groups with the cationic groups on the ink-receiving surface of the print medium. The selected polymer molecule(s) also have hydrogen bond-forming groups configured on each polymer molecule to permit the hydrogen bond-forming groups to interact pair wise with the other said polymer molecules. The method further includes combining the polymer molecule(s) with at least one pigment and a liquid vehicle, to provide an ink-jet ink; depositing the ink onto the ink-receiving surface, to form a wet printed image on said medium; and removing the liquid vehicle from the wet printed image. In some embodiments, the resulting printed image has enhanced scratch resistance and waterfastness.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An ink-jet ink comprising polymer-dispersed pigment particles in a liquid vehicle, wherein said polymer has an acid number of at least about 175 and comprises polymer molecules having anionic groups configured on said polymer molecules to permit association of said anionic groups with cationic groups on a print medium, and having hydrogen bond-forming groups configured on each said polymer molecule to permit said hydrogen bond-forming groups to interact pair wise with other said polymer molecules, upon removal of said liquid vehicle.

2. The ink of claim 1, wherein said polymer-dispersed pigment particles comprise at least one said polymer molecule attached to each pigment particle.

3. The ink of claim 1, wherein said polymer-dispersed pigment particles comprise at least one polymer molecule physically or chemically adsorbed on each pigment particle.

4. The ink of claim 1, wherein said anionic groups comprise carboxylates, sulfonates, sulfates, phosphonates, phosphates, borates, phenoxides, thiolates or a combination of any of those.

5. The ink of claim 1, wherein the weight average molecular weight of said polymer is in the range of about 2000 to about 15,000.

6. The ink of claim 1 wherein said polymer comprises the co-polymerization product of methylvinyl ether and either maleic anhydride or acrylic acid, or both maleic anhydride and acrylic acid.

7. The ink of claim 1 wherein said polymer comprises the polymerization product of methyl acrylic acid or maleic anhydride.

8. The ink of claim 1 wherein said polymer comprises the co-polymerization product of a 1:1 molar ratio of styrene and maleic anhydride in which half of the original carboxylic acid groups in the polymer are converted to the corresponding amide with methylamine.

9. The ink of claim 1 wherein said polymer comprises the co-polymerization product of a 1:1 molar ratio of styrene and maleic anhydride in which half of the original carboxylic acid groups in the polymer are converted to the corresponding amide with ethylamine.

10. The ink of claim 1 wherein said polymer comprises the co-polymerization product of isobutylene and maleic anhydride in which part of the original carboxylic acid groups in the polymer are converted to the corresponding amide using methylamine or ethylamine.

11. The ink of claim 1, wherein said polymer has an acid number of at least 200.

12. The ink of claim 1, wherein said polymer dispersed pigment particles comprise at least one dye molecule attached to said particles.

13. An ink-jet printing system comprising:
an ink receptive medium comprising a surface that includes cationic groups;
the ink-jet ink of claim 1; and
an ink-jet printer configured for jetting said ink onto said medium.

14. The system of claim 13, wherein said cationic surface groups comprise ammonium groups, silanol, or protonated alumina groups, or a combination of any of those.

15. A method of enhancing scratch resistance of an ink-jet printed image, comprising:
jetting the ink-jet ink of claim 1 onto a ink-jet ink receiving medium comprising a surface that includes cationic groups, to form a wet printed image on said medium; and removing the liquid vehicle from the wet printed image to form a scratch resistant film containing said image on said medium.

16. The method of claim 15, wherein
removing said liquid vehicle from the wet printed image comprises drying the wet printed image, to provide a printed image with enhanced scratch resistance and waterfastness.

17. The method of claim 16, wherein said ink-jet ink comprises polymer-dispersed pigment particles in which said at least one polymer molecule is attached to said at least one pigment.

18. The method of claim 17, wherein said at least one polymer molecule attached to said at least one pigment comprises at least one polymer molecule physically or chemically adsorbed on each said pigment particle.

19. The method of claim 16 wherein said film on said medium comprises a minimum 20° gloss value of 40 gu.

20. The ink of claim 1, wherein the ink is buffered at least 1 pH unit above the pKa of the anionic groups of the polymer molecules.

* * * * *